(12) United States Patent
Coveyou et al.

(10) Patent No.: US 7,090,042 B2
(45) Date of Patent: *Aug. 15, 2006

(54) FLOATING DRIVE FOR VEHICLE

(75) Inventors: Jon L. Coveyou, Petoskey, MI (US); Lewis R. Poole, Boyne City, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 142 days.

This patent is subject to a terminal disclaimer.

(21) Appl. No.: 10/395,378

(22) Filed: Mar. 24, 2003

(65) Prior Publication Data

US 2004/0016579 A1 Jan. 29, 2004

Related U.S. Application Data

(63) Continuation-in-part of application No. 09/803,864, filed on Mar. 12, 2001, now Pat. No. 6,564,890.

(51) Int. Cl.
*B62D 61/10* (2006.01)

(52) U.S. Cl. .................. 180/24.01; 180/908; 180/19.2

(58) Field of Classification Search .............. 180/65.1, 180/167, 168, 169, 908, 19.1, 19.2, 20, 21, 180/22, 24.01, 24.03
See application file for complete search history.

(56) References Cited

U.S. PATENT DOCUMENTS

| | | | |
|---|---|---|---|
| 2,370,866 A | 3/1945 | Lewis | |
| 2,698,104 A | 12/1954 | Dudley | |
| 2,874,791 A | 2/1959 | Mellencamp | |
| 3,760,770 A | 9/1973 | Weaver et al. | |
| 3,876,026 A | 4/1975 | Pronasko | |
| 3,993,207 A | 11/1976 | Jones | |
| 4,221,273 A | 9/1980 | Finden | |
| 4,475,611 A | 10/1984 | Fisher | |
| 4,515,235 A | 5/1985 | Yamamoto et al. | |
| 4,529,052 A | 7/1985 | Imai et al. | |
| 4,632,625 A | 12/1986 | Schuller et al. | |
| 4,694,923 A | 9/1987 | Grenzicki | |
| 4,747,457 A | 5/1988 | Buscaiolo et al. | |
| 4,972,917 A * | 11/1990 | Matsumoto et al. | 180/168 |
| 5,201,819 A | 4/1993 | Shiraishi et al. | |
| 5,222,567 A | 6/1993 | Broadhead et al. | |
| 5,351,774 A | 10/1994 | Okamoto | |
| 5,374,151 A * | 12/1994 | Matthews | 414/392 |
| 5,479,998 A | 1/1996 | Ishikawa | |
| 5,487,441 A | 1/1996 | Endo et al. | |
| 5,525,884 A * | 6/1996 | Sugiura et al. | 318/587 |
| 5,526,890 A * | 6/1996 | Kadowaki | 180/8.3 |
| 5,549,175 A | 8/1996 | Torii et al. | |
| 5,628,377 A * | 5/1997 | Le Gloan | 180/21 |

(Continued)

FOREIGN PATENT DOCUMENTS

CA 2184508 3/1998

(Continued)

*Primary Examiner*—Devon Kramer
(74) *Attorney, Agent, or Firm*—Dickinson Wright PLLC

(57) ABSTRACT

A vehicle having a load frame with wheels, a drive frame, a drive wheel, a non-driven rigid castor wheel, and a pivot link assembly. The drive wheel and non-driven rigid castor wheel are each fixed to move with the drive frame. The pivot link assembly couples the drive frame to the load frame to permit the drive frame to move vertically relative to the load frame. The pivot link assembly also has a first pivot axis about which the drive frame is rotatable relative to the load frame.

14 Claims, 10 Drawing Sheets

U.S. PATENT DOCUMENTS

| | | |
|---|---|---|
| 5,860,485 A | 1/1999 | Ebbenga |
| 5,937,959 A * | 8/1999 | Fujii et al. .................... 180/12 |
| 5,988,306 A | 11/1999 | Ooishi |
| 6,000,486 A | 12/1999 | Romick et al. |
| 6,098,732 A | 8/2000 | Romick et al. |
| 6,390,213 B1 * | 5/2002 | Bleicher .................... 180/65.1 |
| 6,564,890 B1 * | 5/2003 | Coveyou ................. 180/24.02 |
| 2003/0115696 A1 * | 6/2003 | Young ........................ 15/49.1 |
| 2003/0150657 A1 * | 8/2003 | Shupp et al. ............... 180/168 |
| 2004/0060748 A1 * | 4/2004 | Molnar ...................... 180/65.1 |

FOREIGN PATENT DOCUMENTS

| | | |
|---|---|---|
| JP | 9-286338 | 11/1997 |
| JP | 90286338 | * 11/1997 |

* cited by examiner

US 7,090,042 B2

FLOATING DRIVE FOR VEHICLE

CROSS-REFERENCE TO RELATED APPLICATION

This application is a continuation-in-part of U.S. patent application Ser. No. 09/803,864, filed Mar. 12, 2001, now U.S. Pat. No. 6,564,890, the entire disclosure of the application is considered part of the disclosure of this application and is hereby incorporated by reference.

BACKGROUND OF THE INVENTION

The present invention is generally directed to material handling vehicles and, more particularly, to a vehicle having a vertically floating drive assembly.

Automatic guided vehicles (AGVs) are used throughout the material handling industry to transport loads. The term AGV is commonly used to refer to robust vehicle designs having any of a number of available automated guidance systems. Automatic guided carts (AGCs) is a term commonly used to refer to a less robust vehicle used for similar but smaller-scale applications. Current AGC designs generally include a frame with swivel castors located at the four corners of the frame. Other features may include a drive wheel assembly and rigid castors for directional control of the cart. In one current design, two rigid castors are fixed to the frame and located approximately midway between the swivel castors on each side of the cart frame. The two pair of swivel castor axes and the rigid castor axis are generally parallel to each other. The steerable driving unit is attached to the cart frame, generally by way of a plate that is hinged and spring loaded from the cart frame to ensure that the steerable drive wheel maintains adequate traction with the support surface.

While this arrangement is generally acceptable for uniform support surfaces, situations where the floor is not level and flat may give rise to losses in the directional control of the cart. More particularly, when the cart encounters an uneven surface, the direct mounting of the swivel and rigid castors to the cart frame may cause one or more of the three sets of castors to become disengaged from the support surface. Since the rigid castors are used for direction control of the cart, loss of contact between the rigid castors and the floor may cause loss of directional control of the cart. The only wheel that has significantly uniform contact with the floor is the hinged and spring loaded steerable drive wheel.

SUMMARY OF THE INVENTION

In view of the above, a need exists for a AGC design that more effectively maintains directional control for the cart or AGV. More particularly, a need exists to maintain both the steerable drive wheel and at least one rigid castor in contact with the floor surface at all times.

To meet these and other needs that will be apparent to those skilled in the art based upon this description and the appended drawings, the present invention is directed to a material handling vehicle having a load bearing support frame with wheels to rollingly engage a support surface as well as a drive assembly having a drive frame supporting a drive wheel and a rigid castor. A pivot link assembly rotationally coupled to the load frame and the drive frame permits the drive frame to vertically float and change angular orientation relative to the drive frame thereby ensuring that the drive wheel and rigid castor maintain operative contact with the support surface even on uneven contours.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
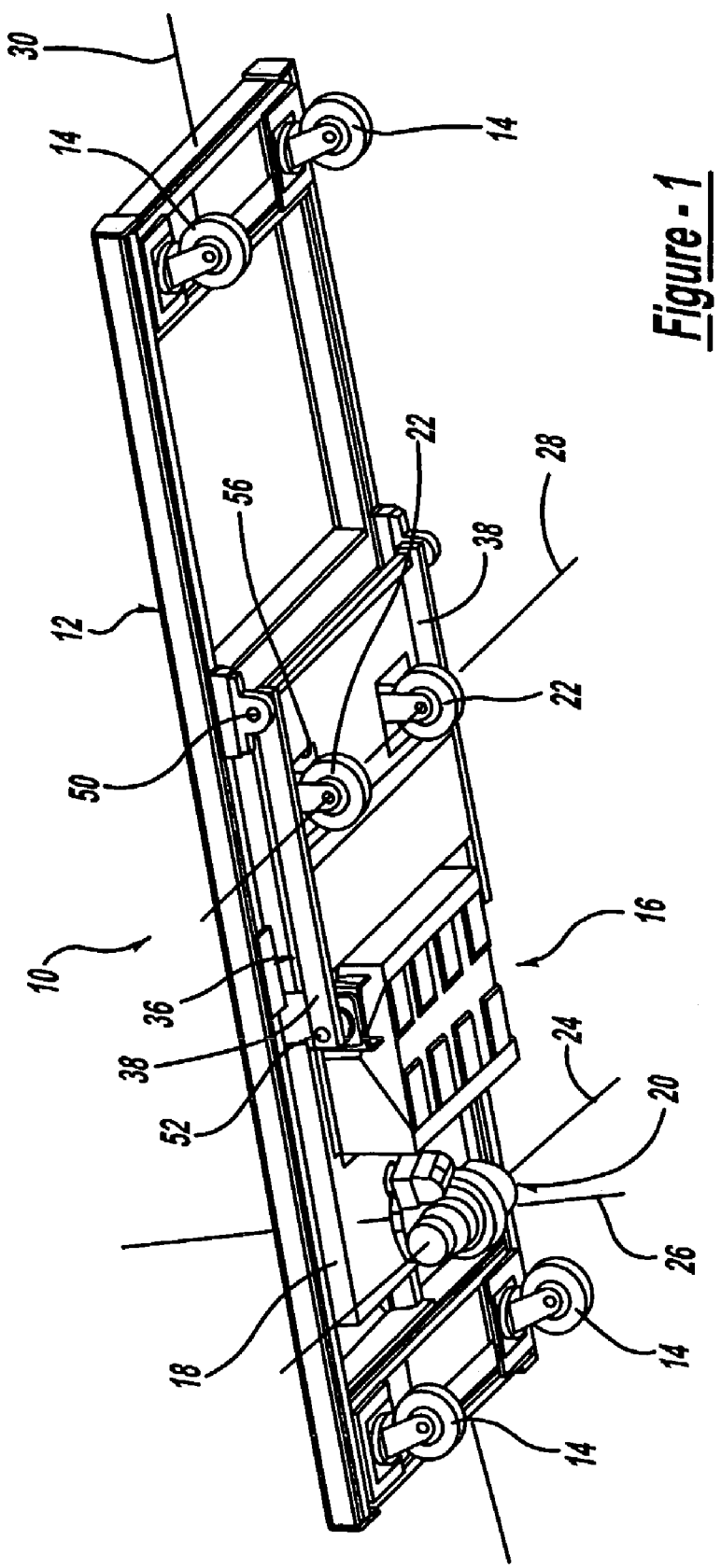
FIG. 1 is an underside perspective view of an AGC according to the present invention.
Figure 2:
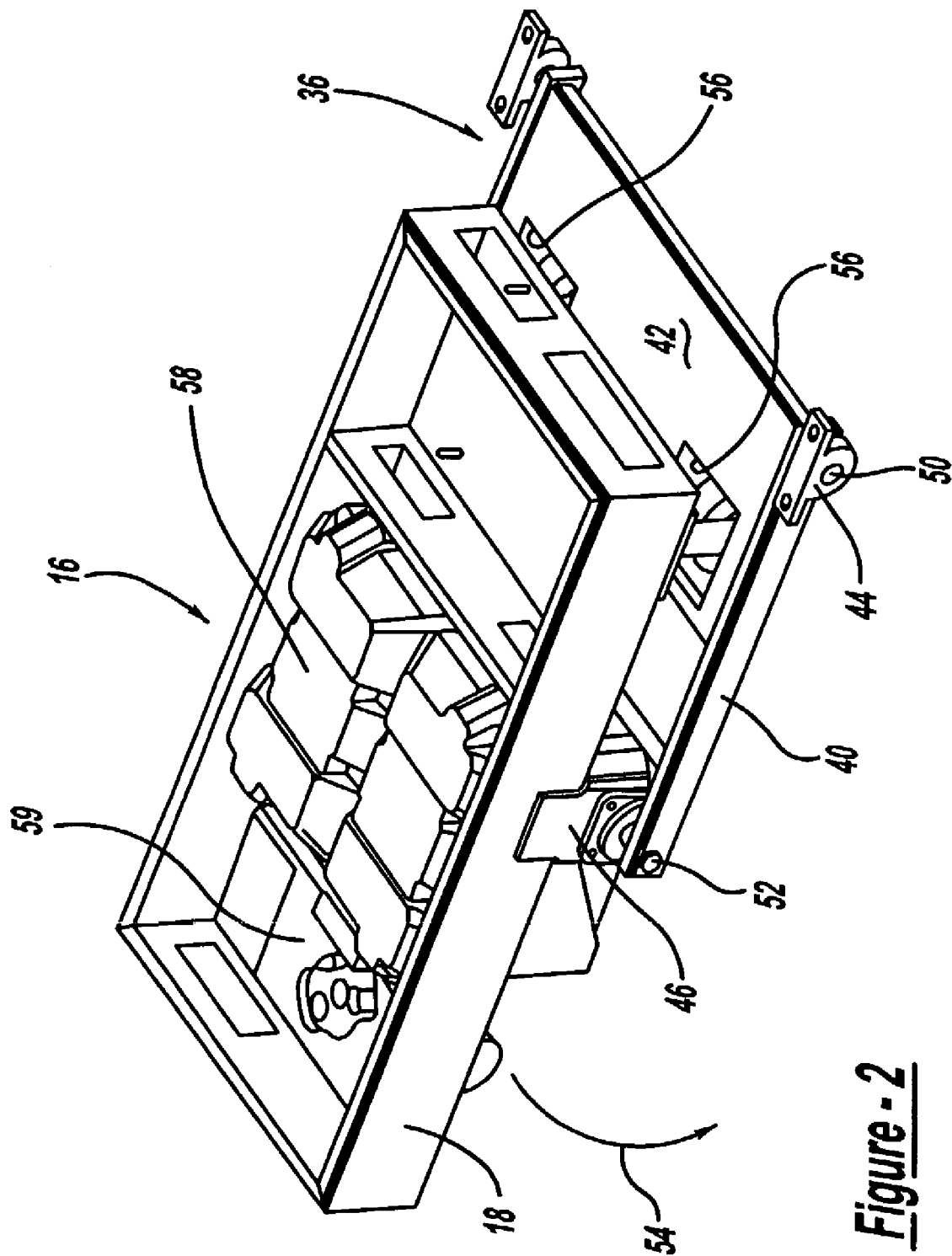
FIG. 2 is an upper perspective view of the drive assembly and float coupling assembly illustrated in FIG. 1.
Figure 3:
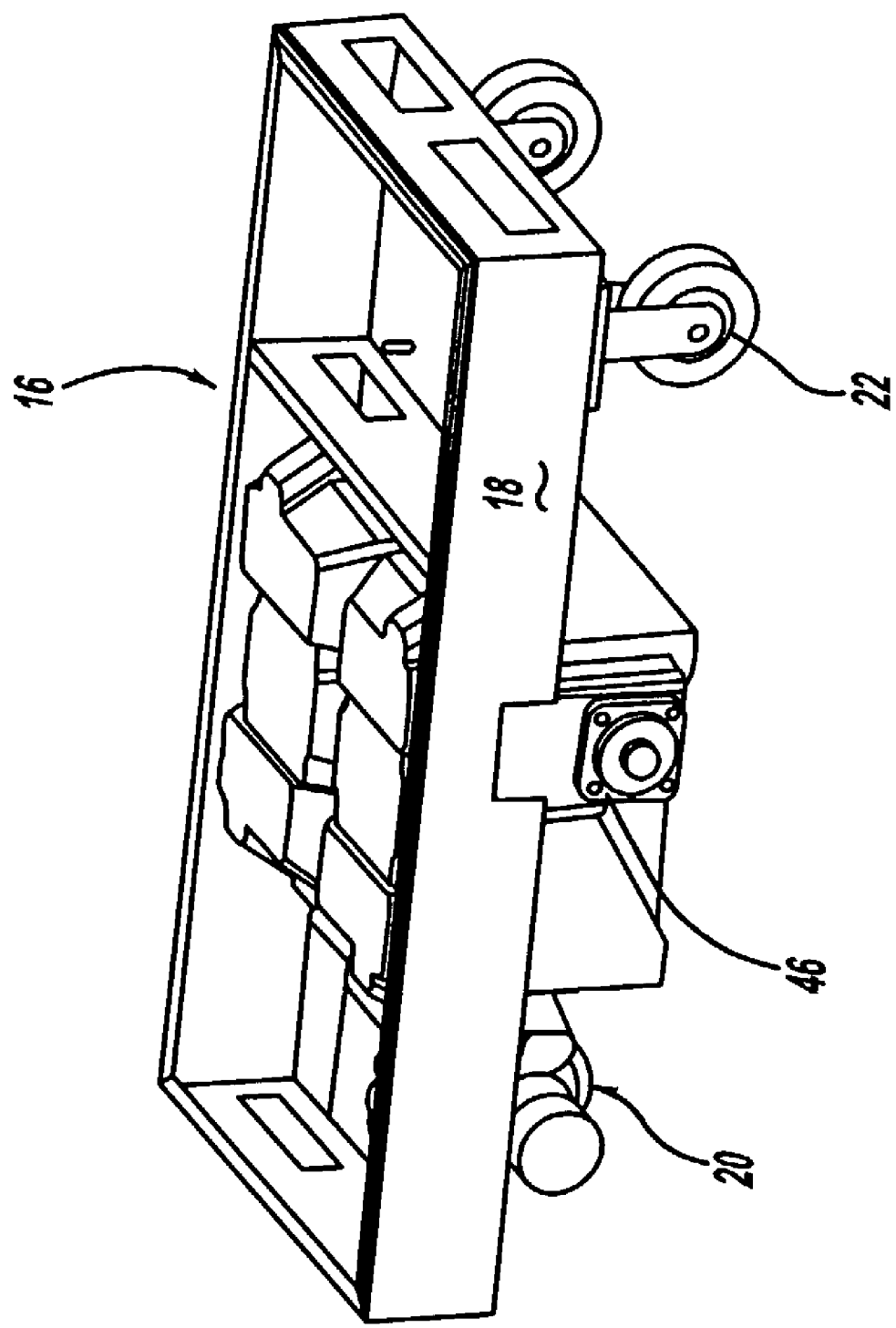
FIG. 3 is a perspective view of the drive assembly.
Figure 4:
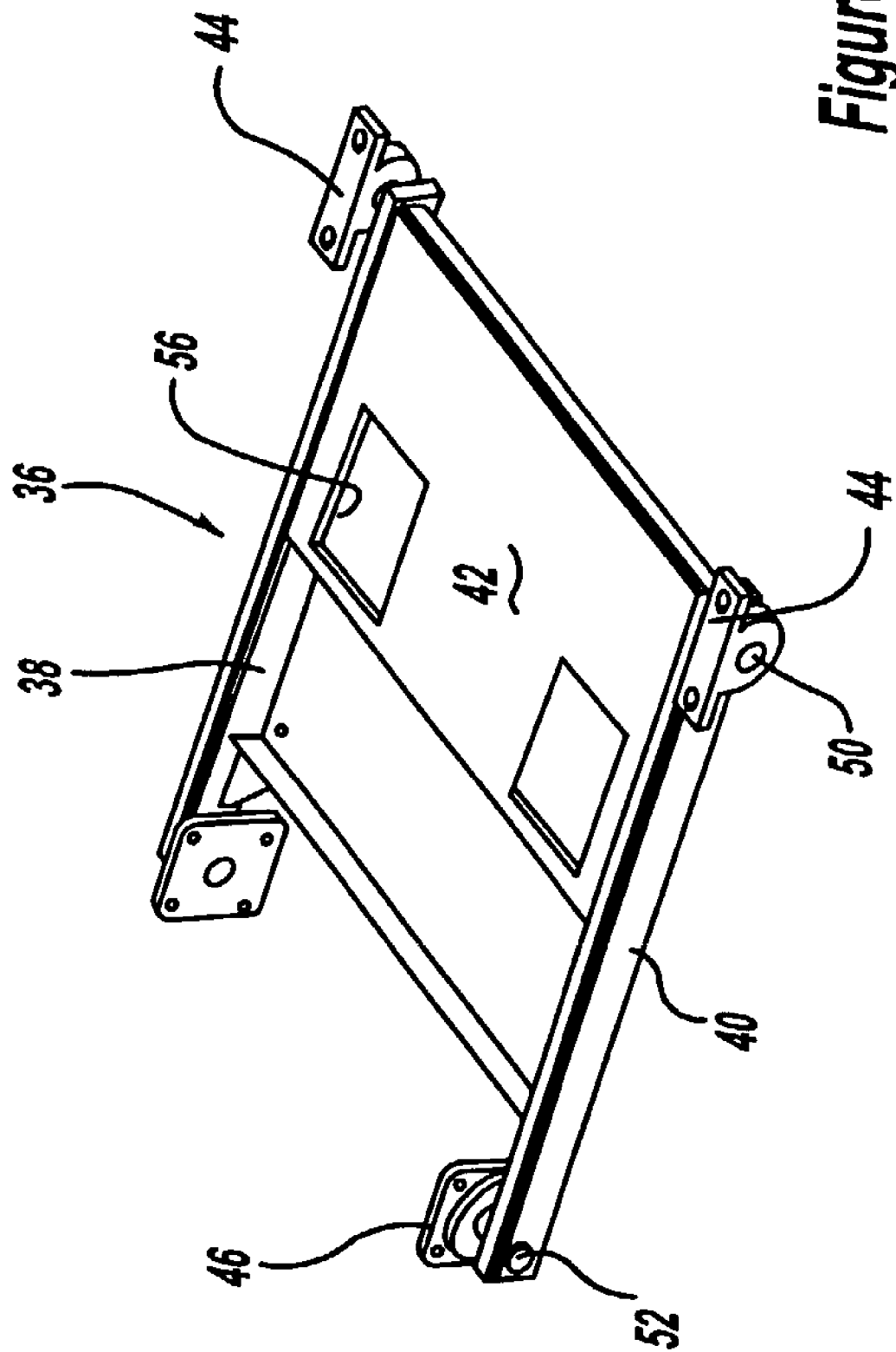
FIG. 4 is a perspective view of the pivot link assembly.
Figure 5:
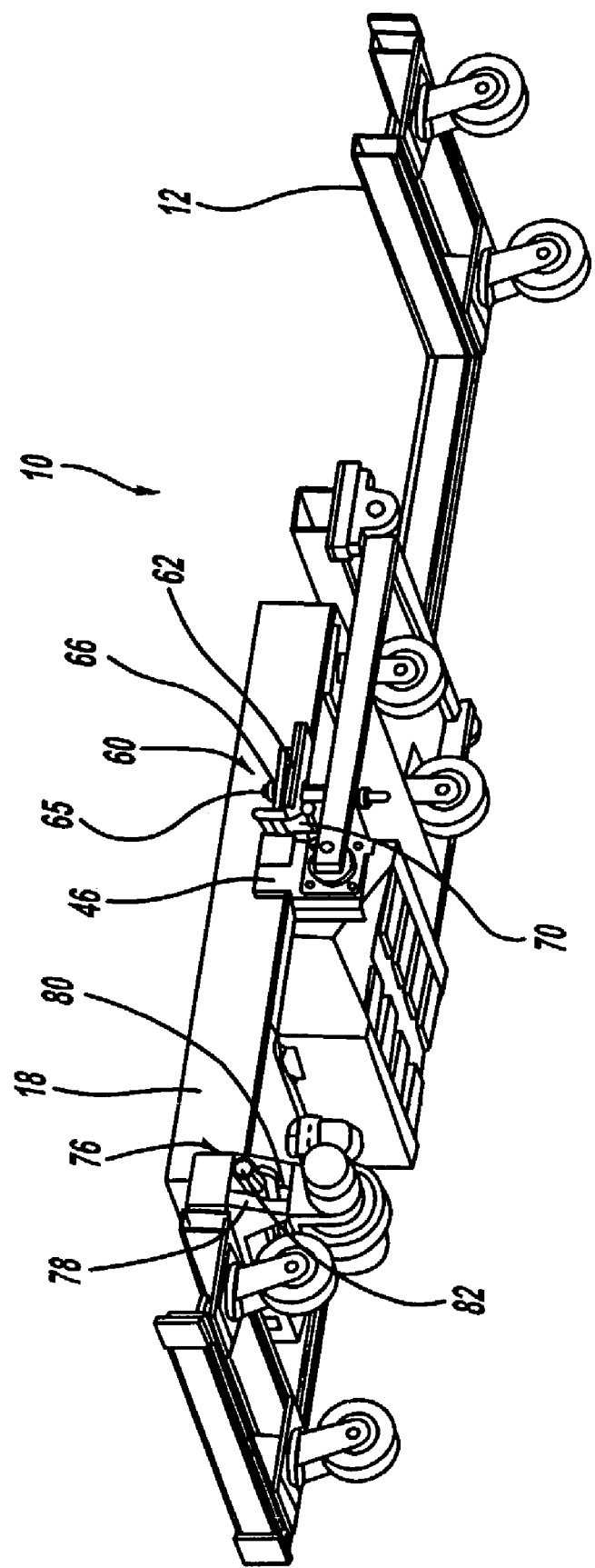
FIG. 5 is a side perspective view of the AGC shown in FIG. 1 with a side load frame tube removed for clarity.

An automated guided cart 10 according to the present invention is illustrated and described with reference to FIGS. 1–5. It should be appreciated that the applications for the vertically floating drive unit according to the present invention may be used in a variety of applications beyond the illustrated AGC. For example, the present invention may be used with automated guided vehicles of a variety of configurations as well as other material handling vehicles permitting the vehicles to function with greater precision along unevenly contoured surfaces.

The AGC 10 includes a load frame 12 supported at each of its corners by swivel castors 14. A drive assembly 16 includes a drive frame 18, a drive wheel 20, and a pair of rigid castors 22. The drive wheel 20 and rigid castors 22 are each fixed for movement with the drive frame 18. As is conventionally known, the drive wheel 20 is rotatable about a drive axis 24 and a steering axis 26. Each of the rigid castors 22 are rotatable only about a single axis 28 oriented perpendicular to the AGC's longitudinal axis 30. Accordingly, when the rigid castors are engaged with the cart support surface, the castors tend to maintain the directional control of the cart in its axial direction.

Figure 10:
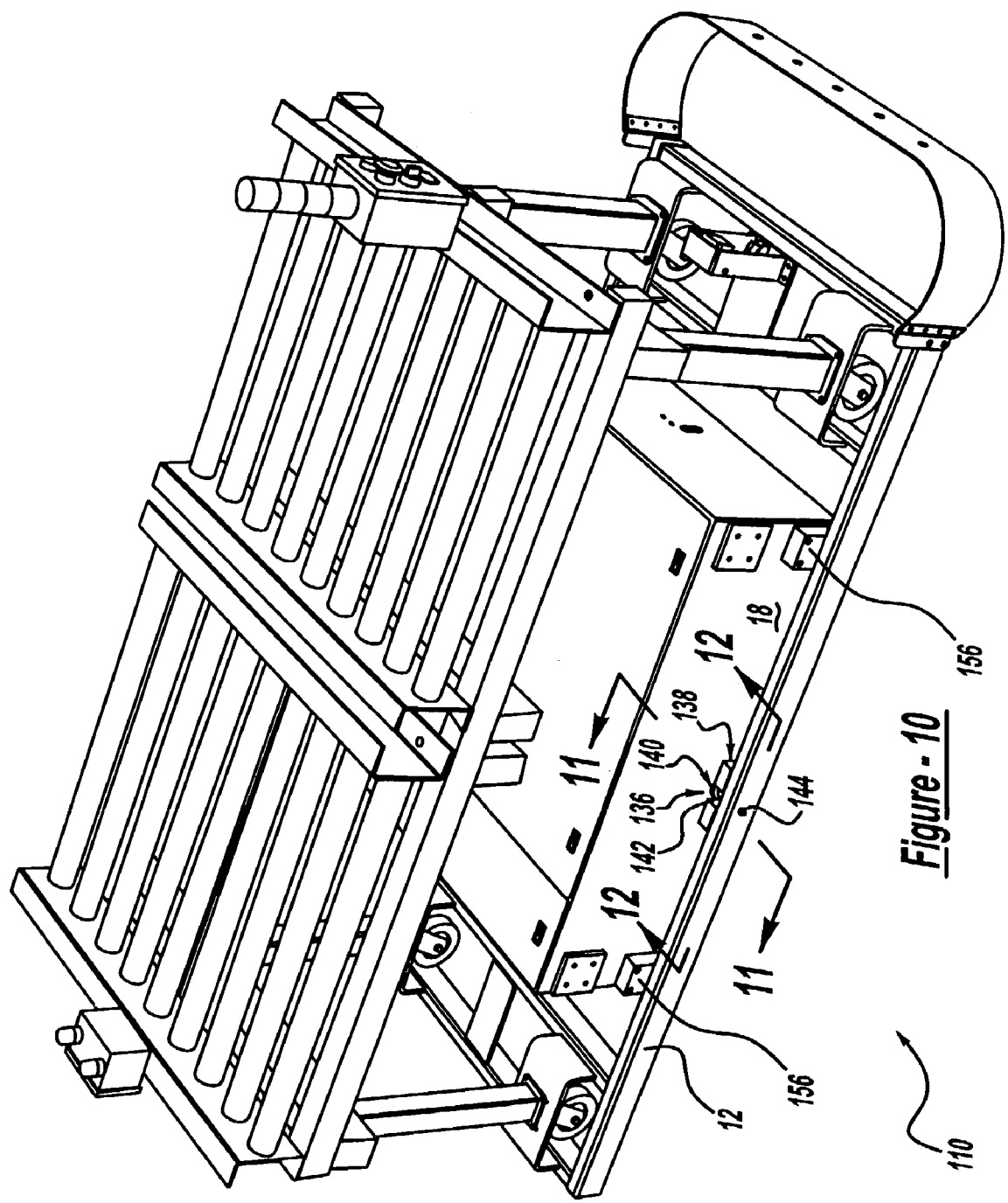
FIG. 10 is a perspective view of an AGC according to the present invention with a second embodiment of the pivot link assembly.
Figure 11:
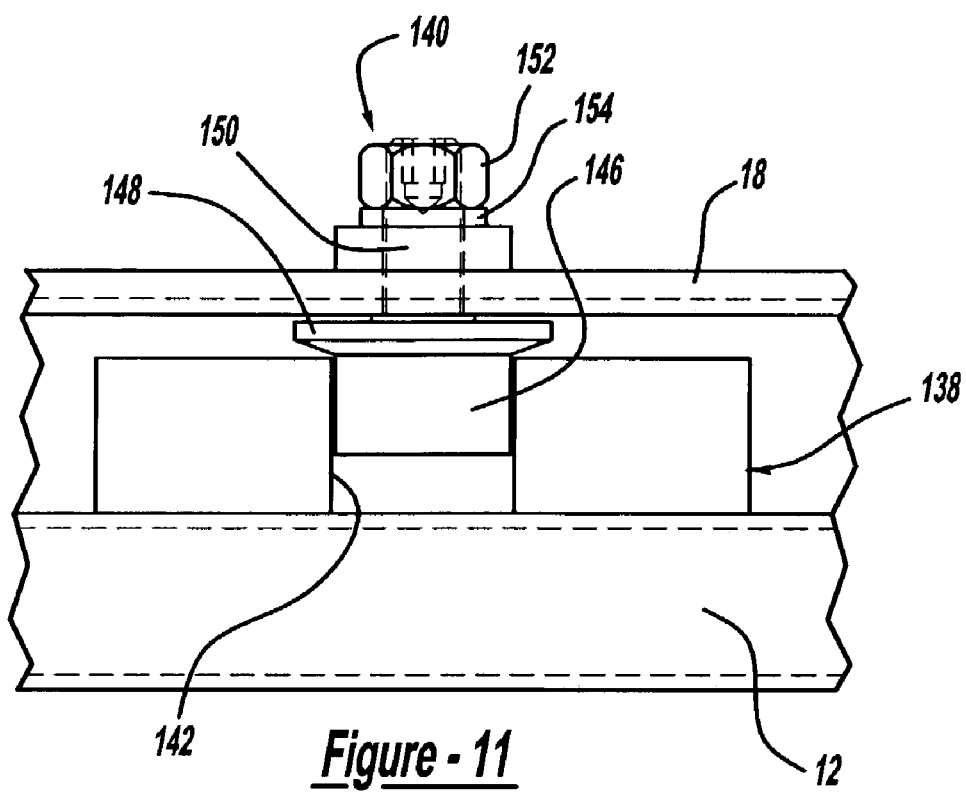
FIG. 11 is a sectional view taken along the line 11—11 shown in FIG. 10.
Figure 12:
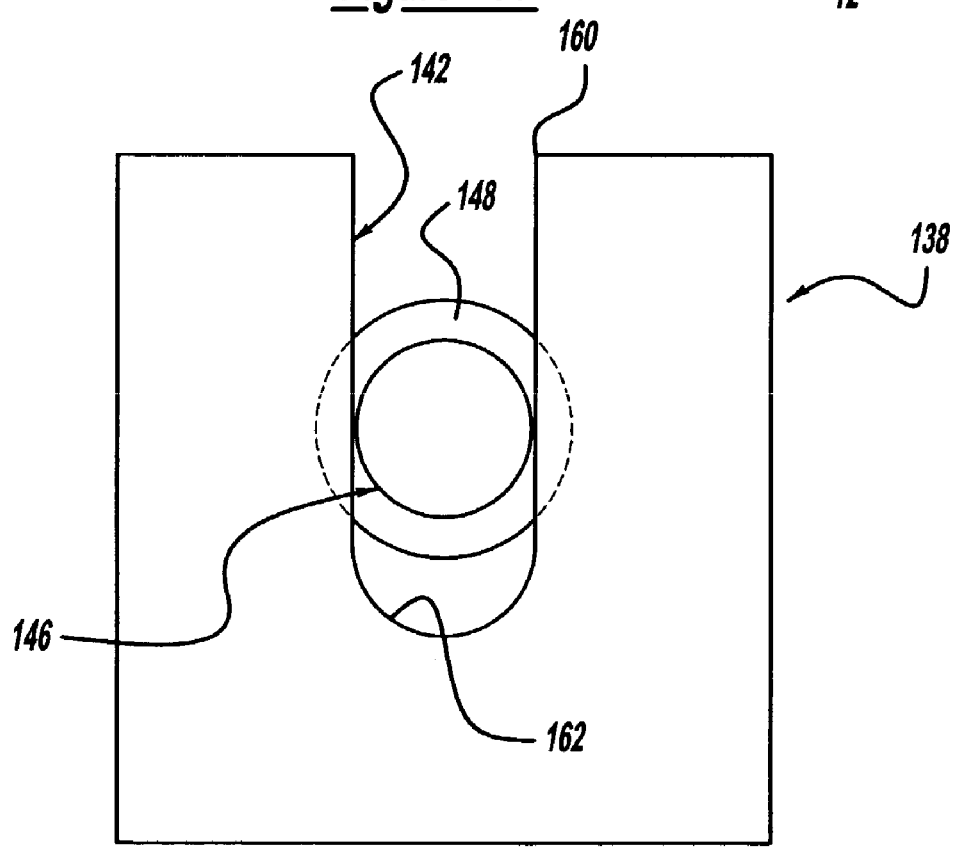
FIG. 12 is an elevational view of the pivot link assembly shown in FIG. 10 illustrating the cam follower and guide block engagement.

A pivot link assembly 36 interconnects the drive assembly 16 with the load frame 12 through two pivot axes thereby permitting the drive assembly to vertically float relative to the load frame. The pivot link assembly 36 also is configured to permit the angular orientation of the drive assembly 16 to vary within a predetermined range relative to the load frame 12. An alternate embodiment of the invention is shown in FIGS. 10–12 and discussed in detail below to include a pivot link assembly 136 having a cam configuration that permits vertical and pivoting movement of the drive assembly 16 relative to the frame 12. In both instances, the pivot link assemblies 36, 136 provide vertical and angular degrees of freedom that maintain the drive wheel unit 20 and rigid castors 22 in contact with the cart support surface, even when the support surface has an uneven contour.

In the first embodiment, the pivot link assembly 36 includes first and second side rails 38 and 40 (FIG. 4) interconnected by a support plate 42. The rails are pivotally coupled at each of their respective ends to the load frame 12 via frame bearing blocks 44 and to the drive frame 18 via drive unit bearing blocks 46. A first pivot shaft 50 rotatably connects the rearward end of the rails 38 and 40 and support plate 42 to the frame bearing blocks 44. In a similar manner, the forward ends of the rails 38 and 40 are rotatably coupled to the respective drive unit bearing blocks 46. The pivot shafts 50 and 52 are preferably oriented parallel to one another and parallel to the rigid castor axis 28.

Figure 6:
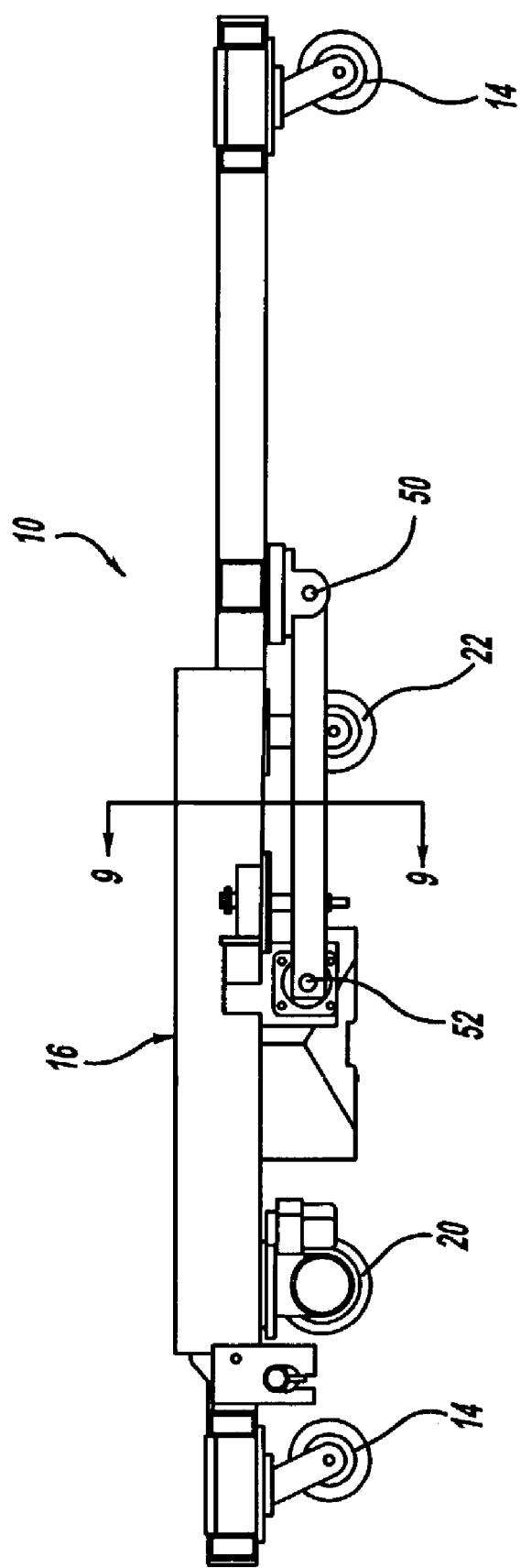
FIG. 6 is a side elevational view of the cart shown in FIG. 5 with the drive assembly in its centered position.
Figure 7:
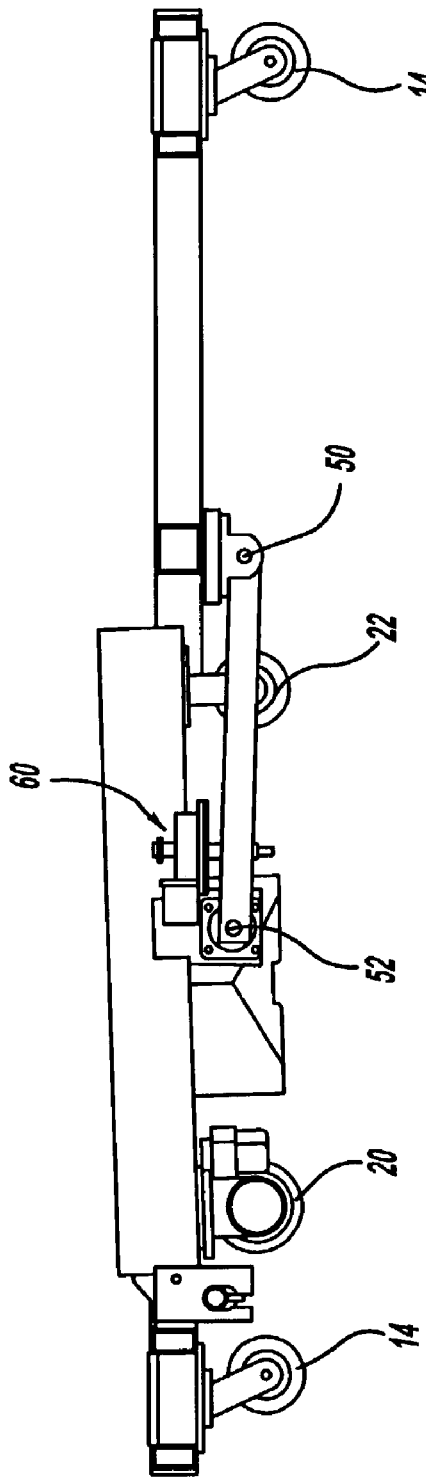
FIG. 7 is a side elevational view of the cart shown in FIG. 5 with the drive assembly in its full up position and rotated counterclockwise.

While the pivot link assembly 36 may have a variety of configurations, the illustrated embodiment includes cut-outs 56 in the plate 42 to receive the rigid castors 22. The vertical float and angular reorientation capability of the drive assembly, as well as the tricycle configuration of the drive wheel and rigid castors, maintain the steerable drive wheel and at least one rigid castor in contact with floor surfaces having uneven contours. As a result, the drive/directional control integrity of the AGC is superior to previous cart designs. An illustration of the float and angular reorientation capability of the present invention is provided in FIGS. 6–8. Specifically, FIG. 6 is a side elevation view of the cart 10 with the drive assembly 16 in its centered position, i.e., with the bearing surfaces of the drive wheel 20, rigid castors 22, and swivel castors 14 at the same elevation. When the cart encounters an uneven surface, the drive assembly 16 is pivotable relative to the load frame 12 about axes 50 and 52 to provide vertical float and angular reorientation. For example, the drive assembly 16 is illustrated in FIG. 7 in its full up position and rotated counterclockwise and in FIG. 8 in its full down position and rotated clockwise. It should be appreciated that these orientations are illustrated for exemplary purposes and that the range of movement of the drive assembly is not necessarily limited to the specific orientations or ranges illustrated and described herein.

The range of vertical float and pivoting movement permitted by the pivot link assembly 36 is preferably limited by appropriately configured and positioned pivot stops. In the illustrated embodiment, the range of vertical float is limited to one inch, with one-half inch of float being provided above and below the centered position shown in FIG. 6. Additionally, a biasing mechanism is preferably operatively positioned between the load frame and the drive frame to apply a downward spring loading on the tricycle drive assembly 16. This additional loading enhances the traction of the drive wheel 20 and rigid castors 22 with the support surface. Finally, it is also desirable to include one or more rotation stops to prevent over-rotation of the drive frame 18. As most clearly illustrated in FIG. 2, the drive wheel 20, and its associated limit switches and actuators 59, are generally positioned at the forward end of the frame 18. A power source, such as the illustrated pair of batteries 58, are in a center compartment and a rear compartment accommodates the control electronics for the cart. In this configuration, the loading on the drive frame 18 tends to rotate the drive assembly in a counterclockwise direction about axis 52 as indicated by arrow 54. The rotation stops are used to limit this rotation.

Figure 8:
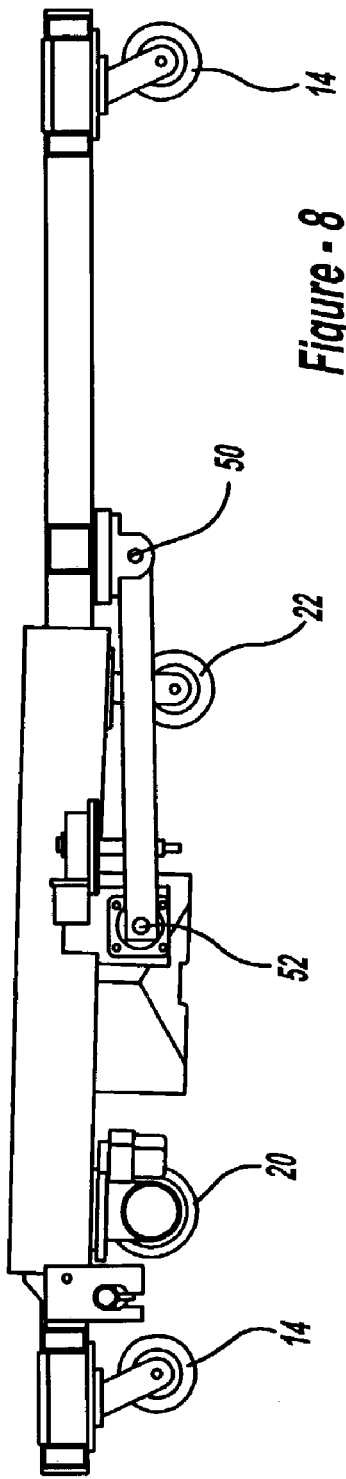
FIG. 8 is a side elevational view of the cart shown in FIG. 5 with the drive assembly in its full down position and rotated clockwise.
Figure 9:
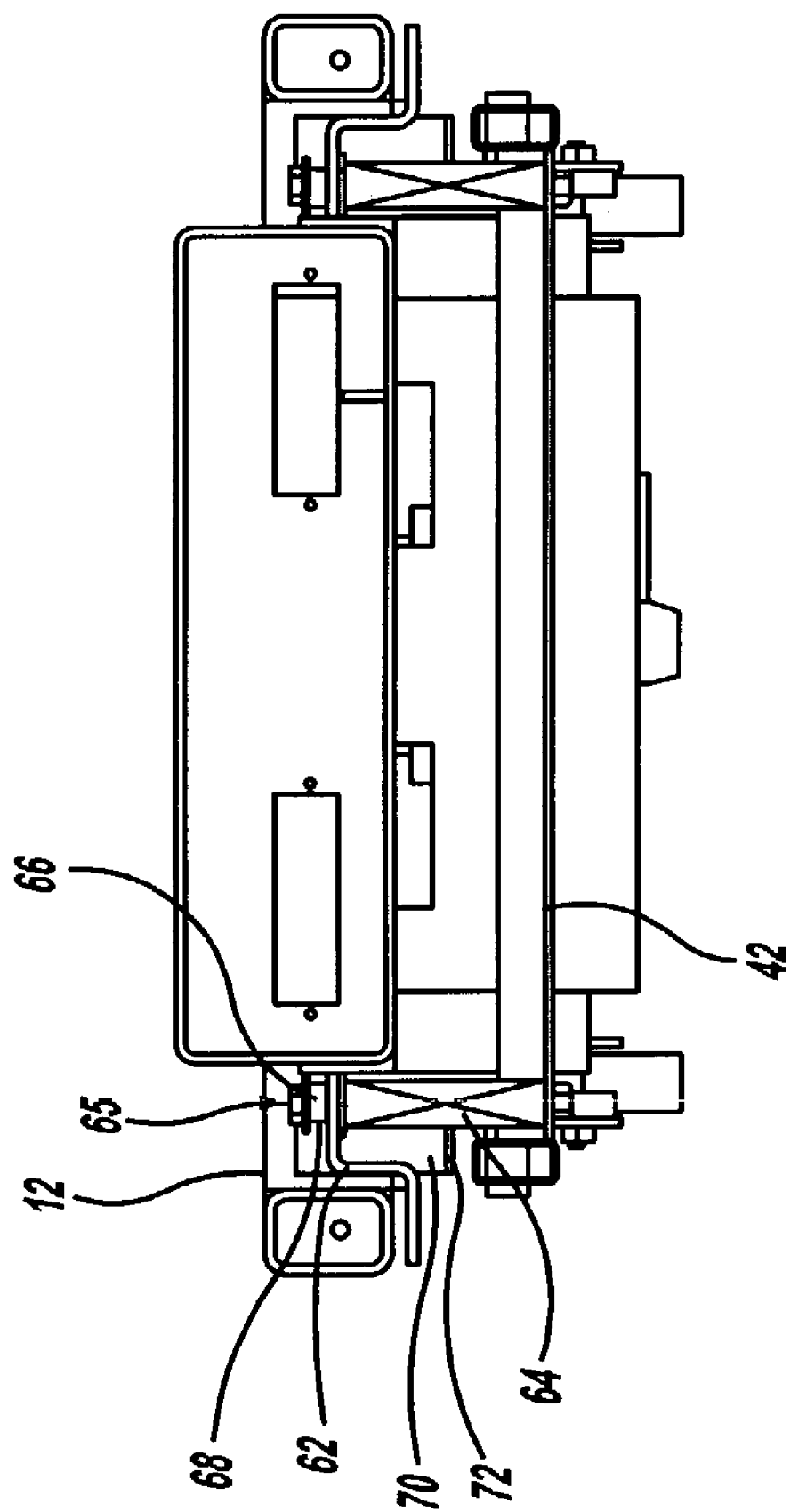
FIG. 9 is a sectional view take along the line 9—9 shown in FIG. 6.

One skilled in the art will appreciate that numerous pivot and rotation stop configurations, such as brackets, bolts, and the like, may be used to limit the vertical float and rotation of the drive assembly and that a variety of springs or other biasing mechanism may serve to maintain drive traction. For example, the illustrated embodiment includes stop assemblies 60 that are positioned proximate the drive unit bearing blocks 46 (FIGS. 5–9) and that serve as the pivot stops and bias mechanism for the drive assembly 16. Each stop assembly 60 includes a spring bracket 62 fixed to the load frame 12 and a coil spring 64 disposed about a bolt 65. The spring 64 is compressed between the bracket 62 and pivot plate 42 to exert a downward bias on the plate. A down stop washer 66 is normally spaced a predetermined distance from the bracket 62 by a spacer tube 68. Thus, the drive assembly 16 is able to pivot downward from its centered position (FIG. 6) until the washer is displaced the predetermined distance and abuts the bracket 62 (FIG. 8). The upward pivot stop is provided by a stop flange 70 (FIGS. 5 and 9) that is fixed to the drive frame 18 and that includes a leg 72 positioned to abut the load frame 12 or bracket 62 when the drive assembly 16 is in its full up position (FIG. 7).

Finally, in the illustrated embodiment, a rotation stop assembly 76 is positioned proximate the forward end of the drive assembly 16. The rotation stop (FIG. 5) includes a rotation bracket 78 having a slot 80 within which a stop pin 82 is disposed for movement. The bracket 78 and pin 82 are each fixed to one of the drive frame 18 and load frame 12 so that relative frame movement is limited by bracket/pin abutment. Notwithstanding the above description of the stop assemblies 60, spring 64, and stop assembly 76, those skilled in the art will appreciate that a variety of equivalent mechanisms known in the art may be used to provide the stop and bias functions without, departing from the scope of the invention defined by the appended claims.

A further benefit of the use of the floating drive unit is that the load frames 12 and drive frame 18 are independently loaded. Thus, the payload supported by the load frame 12 and swivel castors 14 may be varied based upon operational goals whereas the loading on the drive unit is dependent principally upon the weight of the drive unit and any bias provided by the coil spring 62. Also, by including on-board power, control, and mechanical components necessary for autonomous movement, the drive assembly may be disconnected from the load frame 12 and pivot link assembly 36 if it is desired to use the drive assembly as an autonomous vehicle. Possible applications for such autonomous use would include use as a small towing device or lightweight cart where space constraints prevented the effective movement of the larger load frame 12.

A second embodiment of an automated guided cart according to the present invention is shown in FIGS. 10–12 to include a pivot link assembly 136 having a guide member 138 and a cam 140. Just as with the cart 10 shown in FIGS. 1–9, the cart 110 of FIGS. 10–12 includes a drive assembly 16 having a drive frame 18 as well as a drive wheel and a pair of rigid castors (not shown) fixed to move with the drive frame 18. The guide member 138 is attached to one of the load frame 12 or drive frame 18 and includes a vertical slot 142. The cam 140 is attached to the other of the load frame 12 and the drive frame 18 and disposed for vertical movement within the slot 142. The cam and slot engagement permits the drive assembly to float vertically relative to the load frame 12 and pivot relative thereto about an axis 144.

In the illustrated embodiment, the cam 140 includes a generally cylindrical follower 146 with a flanged 148 (FIGS. 11 and 12). A pin 150 and nut 152 may be used to attach the follower 146 to the drive frame 18 and preferably permits rotation of the follower 146 about the pin axis 144. The nut 152 is on an inner side of the drive frame and a block 154 is disposed between the nut and frame to provide proper spacing. The use of a flange 148 on the follower assists in properly centering the drive assembly relative to the load frame 12. Guide blocks 156 (FIG. 10) are preferably secured to one of the drive frame 18 and load frame 12 to further assist in centering. The guide blocks 156 are preferably, though not necessarily, comprised of a low friction material such as UHMW and have a smooth engagement surface.

The guide member 138 is illustrated as a single block with the vertical slot 142 having an open upper end 160 and a radiused closed lower end 162. The closed end limits the downward float of the driving frame relative to the load frame while the open upper end 160 permits selective detachment of the driving assembly. The guide member is preferably comprised of a wear resistant material such as steel. Notwithstanding these exemplary illustrations, those skilled in the art will appreciate that the specific material and configuration of the guide member may be modified without departing from the scope of the invention defined by the appended claims.

Just as with the pivot link assembly 36, the assembly 136 permits the drive frame 18 to move vertically, either with or without a change in angular orientation, relative to the load frame thereby permitting the drive wheel and rigid castor wheels of the drive assembly to effectively maintain operative contact with the support surface. For completeness it is noted that a vehicle having the pivot link assembly 136 is particularly suited for large load applications due to the robustness of the assembly. Further, the assembly 136 permits the drive assembly to be readily detached from the load handling frame and presents a simple design that is cost effective to manufacture. Still further, the engagement between the cam 140 and the guide block 138 restricts longitudinal movement of the drive frame 18 relative to the load frame 12.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A vehicle comprising:
   a load frame having wheels;
   a drive frame;
   a drive wheel and a non-driven castor wheel each fixed to move with said drive frame, said non-driven castor wheel being substantially fixed from swiveling, wherein said drive wheel is rotatable about a first axis to provide a driving force and rotatable about a second axis to provide steering; and
   a pivot link assembly coupling the drive frame to the load frame to permit said drive frame to move vertically relative to said load frame, said pivot link assembly having a first pivot axis and a second pivot axis spaced from said first pivot axis, and wherein said pivot link assembly is coupled to said load frame at said second pivot axis and to said drive frame at said first pivot axis, said drive frame being rotatable about said first pivot axis relative to said load frame.

2. The vehicle of claim 1 wherein said pivot link assembly includes a pair of pivot rails each having a first end pivotally coupled to the load frame and a second end pivotally coupled to the drive frame.

3. The vehicle of claim 1 wherein said non-driven castor wheel is rotatable about only a single axis of rotation.

4. The vehicle of claim 3 wherein said pivot link assembly includes a pair of pivot rails each having a first end pivotally coupled to the load frame and a second end pivotally coupled to the drive frame.

5. A vehicle comprising:
   a load frame having wheels;
   a drive frame;
   a drive wheel and a non-driven castor wheel each fixed to move with said drive frame; and
   a pivot link assembly coupling the drive frame to the load frame to permit said drive frame to move vertically relative to said load frame, said pivot link assembly having a first pivot axis about which said drive frame is rotatable relative to said load frame and wherein said pivot link assembly includes a guide member and a cam, said guide member has a vertical slot, and said cam is movably disposed in said vertical slot.

6. The vehicle of claim 5 wherein said cam includes a follower rotatable about an axis.

7. The vehicle of claim 6 wherein said follower includes a centering flange.

8. The vehicle of claim 5 wherein said non-driven castor wheel is rotatable about only a single axis of rotation.

9. The vehicle of claim 5 wherein said drive wheel is rotatable about a first axis to provide a driving force and rotatable about a second axis to provide steering.

10. A vehicle comprising:
    a load frame having at least two wheels;
    a drive frame;
    a drive wheel and a non-driven castor wheel each fixed to move with said drive frame, said non-driven castor wheel being substantially fixed from swiveling;
    a pivot link assembly coupling the drive frame to the load frame to permit said drive frame to move vertically relative to said load frame, said pivot link assembly having a first pivot axis about which said drive frame is rotatable relative to said load frame; and
    a second non-driven castor wheel rotatable about only a single axis and mounted to said drive frame, said drive wheel and said castor wheels being positioned to form a triangle and wherein said castor wheels are positioned on said drive frame between said drive wheel and said wheels on said load frame.

11. The vehicle of claim 10 wherein said drive wheel is rotatable about a first axis to provide a driving force and rotatable about a second axis to provide steering.

12. A vehicle comprising:
    a load frame having wheels;
    a drive frame;
    a drive wheel and a non-driven castor wheel each fixed to move with said drive frame, said drive wheel being rotatable about first and second axes, said non-driven castor wheel being rotatable about only a single axis; and pivot connector means coupling said drive frame to said load frame, said pivot connector means including a first pivot axis that is fixed to one of said drive frame and load frame and vertically movable relative to the other of said drive frame and load frame, and wherein said drive frame is rotatable about said first pivot axis and wherein said pivot connector means includes a pivot link assembly having a guide member and a cam, wherein said guide member has a vertical slot, and wherein said cam is movably disposed in said vertical slot and defines said first pivot axis.

13. The vehicle of claim 12 wherein said cam includes a follower having a centering flange.

14. The vehicle of claim 13 wherein said follower is rotatable about said first pivot axis.

* * * * *

UNITED STATES PATENT AND TRADEMARK OFFICE
CERTIFICATE OF CORRECTION

| | |
|---|---|
| PATENT NO. | : 7,090,042 B2 |
| APPLICATION NO. | : 10/395378 |
| DATED | : August 15, 2006 |
| INVENTOR(S) | : Jon L. Coveyou et al. |

Page 1 of 1

It is certified that error appears in the above-identified patent and that said Letters Patent is hereby corrected as shown below:

Column 4, line 42, after "without" delete ",".

Column 4, line 45, "frames 12" should be --frame 12--.

Signed and Sealed this

Fifth Day of December, 2006

JON W. DUDAS
*Director of the United States Patent and Trademark Office*